United States Patent
Graeber et al.

(10) Patent No.: US 8,412,549 B2
(45) Date of Patent: Apr. 2, 2013

(54) ANALYZING BUSINESS DATA FOR PLANNING APPLICATIONS

(75) Inventors: Astrid R. Graeber, Walldorf (DE);
Christian Baeck, Wiesloch (DE);
Martin J. Wilmes, Oftersheim (DE);
Christoph Scheiber, Reilingen (DE);
Werner Sinzig, Nussloch (DE)

(73) Assignee: SAP AG, Walldorf (DE)

( * ) Notice: Subject to any disclaimer, the term of this patent is extended or adjusted under 35 U.S.C. 154(b) by 3 days.

(21) Appl. No.: 12/981,862

(22) Filed: Dec. 30, 2010

(65) Prior Publication Data

US 2011/0282704 A1 Nov. 17, 2011

Related U.S. Application Data

(60) Provisional application No. 61/334,801, filed on May 14, 2010.

(51) Int. Cl.
*G06Q 10/00* (2012.01)
(52) U.S. Cl. .................. 705/7.11; 705/7.12; 705/7.13; 705/7.23; 705/7.36
(58) Field of Classification Search ............... 705/7.11, 705/7.12, 7.13, 7.23, 7.36
See application file for complete search history.

(56) References Cited

U.S. PATENT DOCUMENTS

| 7,454,701 | B2 | 11/2008 | Graeber | |
|---|---|---|---|---|
| 7,568,019 | B1* | 7/2009 | Bhargava et al. | 709/223 |
| 2005/0182773 | A1* | 8/2005 | Feinsmith | 707/100 |
| 2008/0301124 | A1* | 12/2008 | Alves et al. | 707/5 |
| 2009/0055733 | A1 | 2/2009 | Graeber | |
| 2010/0070448 | A1* | 3/2010 | Omoigui | 706/47 |
| 2010/0153158 | A1 | 6/2010 | Wex et al. | |
| 2010/0153432 | A1 | 6/2010 | Pfeifer et al. | |

* cited by examiner

*Primary Examiner* — Thomas Dixon
*Assistant Examiner* — Gerald Vizvary
(74) *Attorney, Agent, or Firm* — Fish & Richardson P.C.

(57) ABSTRACT

The present disclosure involves systems, software, and computer implemented methods for providing efficient planning through analyzing data. One process includes operations for generating a business object containing parameters and plan data of a business plan, the plan data represented by a plurality of aggregation levels. A change to a particular item in the plan data is identified, the change associated with a particular aggregation level. The change to the particular item is automatically propagated to a lowest level of granularity of the plan data, and the change to the particular item is available to each of the plurality of aggregation levels.

18 Claims, 8 Drawing Sheets

ANALYZING BUSINESS DATA FOR PLANNING APPLICATIONS

CLAIM OF PRIORITY

This application claims priority under 35 USC §119(e) to U.S. Patent Application Ser. No. 61/334,801, filed on May 14, 2010, the entire contents of which is hereby incorporated by reference.

TECHNICAL FIELD

The present disclosure relates to software, computer systems, and computer implemented methods for providing efficient planning through analyzing data.

BACKGROUND

Business organizations can engage in a planning process to help formulate business strategy, generate budgets, forecast performance, manage projects, consolidate tasks, and support operational business activities. Driven by unpredictable and fast-changing market conditions, business organizations can have many types of plans in use. Without a single source of data, however, planning processes can be plagued by inconsistent, incorrect, obsolete, or missing data.

Further, in certain instances, plans are generated by different users with little coordination between them. Planning applications can provide functionality for scheduling, workflow and notification. Users can implement pre-configured processes or create new customized processes specific to the organization. Generating a plan to address problems or identify opportunities can involve forecasting future conditions and providing help for model scenarios. Users can view, modify, store, and access data at different aggregation levels. In some instances, the users may need context data associated with the same plan from various operational applications at the same point in time. A business application, however, cannot be separated from operational and analytical applications.

Typically, business planning functions such as copying, forecasting, disaggregation, etc. need to manage a huge volume of data. However, end users expect response times in less than a second. For flexibility reasons, business planning applications are frequently designed as spreadsheet applications with local data. Further, in large enterprises, business planning applications need to be combined with centralized data to provide consistency.

SUMMARY

The present disclosure describes techniques for providing efficient planning through analyzing data. A computer program product is encoded on a tangible storage medium, where the product comprises computer readable instructions for causing one or more processors to perform operations. These operations can include generating a business object containing parameters and plan data of a business plan, the plan data represented by a plurality of aggregation levels. A change to a particular item in the plan data is identified, the change associated with a particular aggregation level. The change to the particular item is automatically propagated to a lowest level of granularity of the plan data, and the change to the particular item is available to each of the plurality of aggregation levels.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 6A-B illustrate example screenshots of planning user interfaces presented using an appropriate system, such as the system described in FIG. 1;

DETAILED DESCRIPTION

Figure 1:
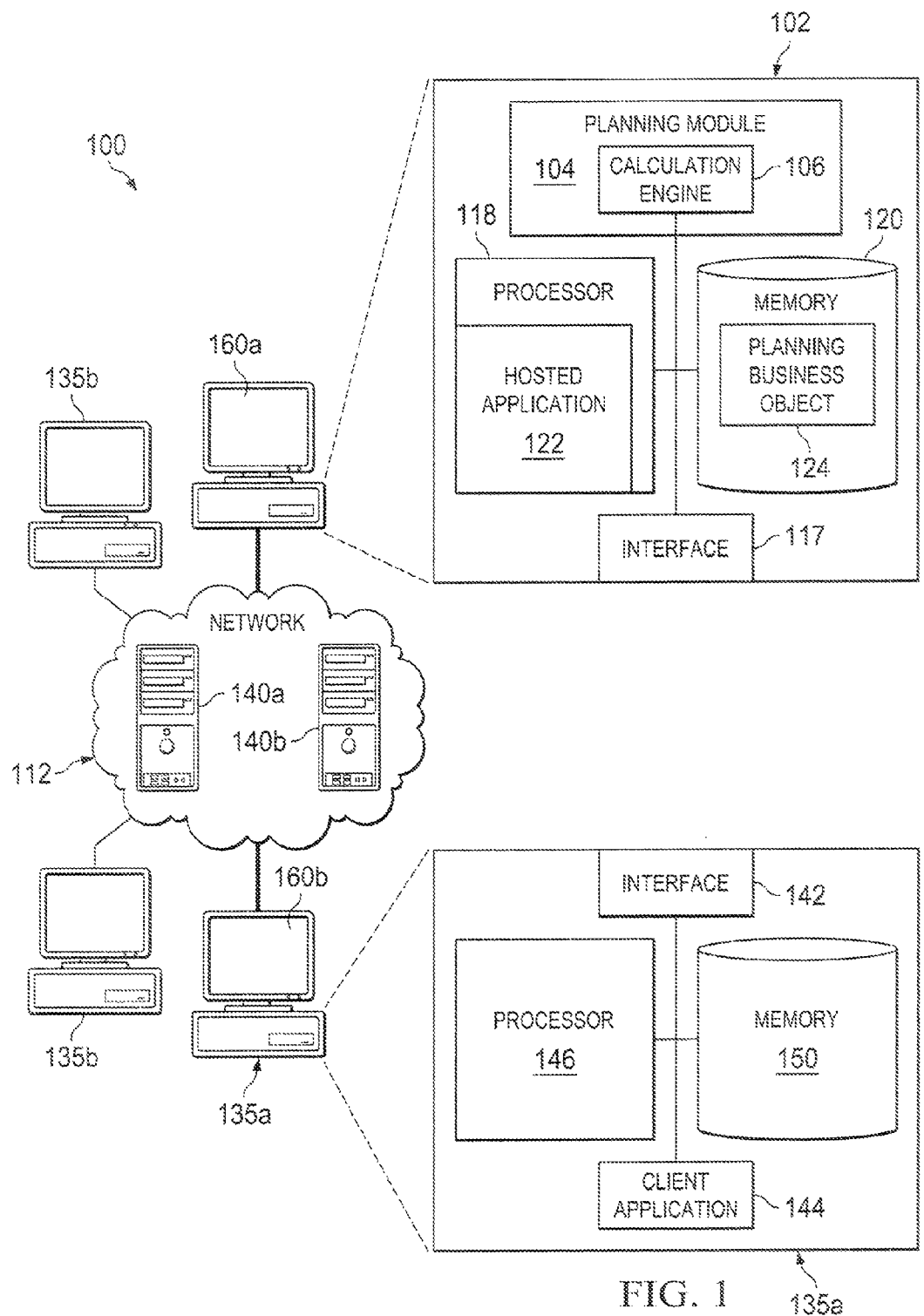
FIG. 1 illustrates an example environment for providing efficient planning and analyzing business data information.

This disclosure generally describes computer systems, software, and computer implemented methods for providing efficient planning or otherwise analyzing financial or other business data information. Business plans are used to manage and facilitate business tasks and activities in a planning application. In some instances, business plans can include a hierarchy of multiple aggregation levels, each aggregation level associated with a different level of data in a business plan instance. Different users can modify data associated with the business plan at different aggregation levels. A business object can be used to model the planning application and provide accessibility to configuration settings and data associated with the plan to the users. Further, the planning application can have access to both analytical and transactional data for the business plan. Accordingly, changes in transactional data associated with the plan can be propagated and viewed by users working on different aggregation levels within the plan. A user can modify data at one aggregation level, and the change can be automatically distributed to different aggregation levels associated with the same business plan. The changes to the data can be presented to the user through on-the-fly updates of certain figures, cells, or values in other aggregation levels associated with the changed data. From a front-end perspective, the planning applications need to be enhanced with context sensitive action panes that help users combine planning functions with related parameters and to guide them through the planning process.

The modeling of business applications using business objects can include various features. For example, the present disclosure may involve a planning application that has concurrent access to analytical and transactional data. This planning application can help facilitate the automatic distribution of plan data to storage layer granularity and plan data can be entered and changed on any aggregation level. As such, planning functions are available on any aggregation level and automatic distribution helps ensure data consistencies on all hierarchy levels. Further, applications can choose the distribution function per plan instance and key figure or leave this decision to the user, and the underlying infrastructure may model fully ESA-compliant planning applications. Accordingly, the planning application may be highly flexible. For example, current UIs may require hundreds of configuration parameters and then require that the user understand the semantics. Here, a user or application developer can add arbitrary master data attributes or key figures to the layouts or a key user can choose characteristics per plan instance. The planning application may also support a planning function for data import with preview and such planning functions can be linked with reports for preview. The planning application may utilize a consistent business object (or BO) such that plan BO instances are based on an entity with lifecycle and attributes, accessible for any consumer. The planning application may also implement or provide read/write access to transactional buffer on arbitrary aggregation levels with complex filter criteria (similar to SQL).

A reusable set of selection parameter values, known as variants, can be used to help a user display certain sets of plan data when a planning application is executed. The layouts and variants of the planning application are available for plan data maintenance, but on-the-fly modification in the layout and variant runtime objects can allow the layouts and variants to, in certain embodiments, only contain the characteristics that are enabled for the currently maintained plan instance(s). Accordingly, layouts can be shipped to provide planning applications that run out-of-the-box but still offer structural flexibility. The communication between a spreadsheet application user interface and backend system for navigation and the selection or maintenance of layouts and variants may not be modified for planning, but use the standard mechanisms in place for reporting.

One potential benefit of modeling planning applications with business objects is that changes to transactional data associated with one aggregation level in a business plan are propagated to other aggregation levels of the business plan. Generally, analytical data and transactional data are accessed from different repositories. Coupling transactional data with analytical data allows immediate inclusion of transactional changes at the lowest aggregation level. Accordingly, the transactional changes are then available to all aggregation levels. Another benefit of having analytical, transactional, and planning data in one system is that both transactional and analytical can be displayed. Further, both transactional and analytical data can be copied into a plan as starting point for planning without the need to first replicate the data to another repository. The plan data can be used for transactional purposes without a replication step. For example, a demand plan can be released as the basis for production planning, or an application that allows users to create purchase orders can read the plan data in order to check that the orders do not exceed the budget granted, without replicating the plan data.

Further, the on-the-fly modification of a planning layout can be visible in real time to users involved with the business plan at different aggregation levels. Accordingly, the displayed components in the user interface are adapted for different plan instances. For example, if a planning application offers structural flexibility, neither the layout nor parameter screens will contain characteristics that have been deactivated for the currently displayed plan instance. Further, existing layout and variants can be reused across plan instances, which enhances planning applications without structural flexibility.

For planning applications that are implemented with structural flexibility, the structures of plan instances that a single user works on should still be relatively stable. Accordingly, a user of flexible planning applications can conveniently reuse existing layouts and variants for different plan instances. For example, for use case profitability planning, plan instances can be defined centrally per company for a fiscal year. For one company, customers usually plan data on the same structure and granularity for a period of time in order to maintain consistency of data. In a use case sales target setting, plan instances can be defined per sales unit per year by a manager. Layouts and variants can be user specific, but even if every manager chooses a different structure for his plan, he will probably not choose a completely different structure every year.

Another potential benefit is that several plan instances can be displayed or maintained together, even if the plan instances have different structures. If a characteristic is not available in one plan instance, the corresponding cell value for the characteristic would be "initial." The plan business object ensures that the cell properties are appropriately set to "read-only" and that a user cannot enter values for characteristics that are not allowed in the plan instance.

Turning to the illustrated example, FIG. 1 illustrates an example environment 100 for providing efficient planning and analyzing financial or other business data information. The illustrated environment 100 includes or is communicably coupled with one or more clients 135 or servers 125, at least some of which communicate across network 112. In general, environment 100 depicts an example configuration of a system capable of facilitating efficient planning. In some implementations, the planning module of the present disclosure may be implemented as a hosted application on a server, such as server 125, accessible to a user at client 135a through a network 112. In certain instances, clients 135a-b and server 125 can be logically grouped and accessible within a cloud computing network. Accordingly, the service for providing efficient planning may be provided to a user of client 135 as an on-demand solution through the cloud computing network as well as a traditional server-client system or a local application at client 135a. Alternatively, the planning service may be provided through a traditional server-client implementation or locally at client 135a without the need for accessing a hosted application through network 112.

In general, server 125 is any server that stores one or more hosted applications 122, where at least a portion of the hosted applications are executed via requests and responses sent to users or clients within and communicably coupled to the illustrated environment 100 of FIG. 1. For example, server 125 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 125 may store a plurality of various hosted applications 122, while in other instances, the server 125 may be a dedicated server meant to store and execute only a single hosted application 122. In some instances, the server 125 may comprise a web server or be communicably coupled with a web server, where the hosted applications 122 represent one or more web-based applications accessed and executed via network 112 by clients 135 of the system to perform the programmed tasks or operations of the hosted application 122.

At a high level, the server 125 comprises an electronic computing device operable to receive, transmit, process, store, or manage data and information associated with the environment 100. The server 125 illustrated in FIG. 1 can be responsible for receiving application requests from one or more client applications or business applications associated with clients 135 of environment 100 and responding to the received requests by processing said requests in the associated hosted application 122, and sending the appropriate response from the hosted application 122 back to the requesting client application. The server 125 may also receive requests and respond to requests from other components on network 112. Alternatively, the hosted application 122 at server 125 can be capable of processing and responding to local requests from a user accessing server 125 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single server 125, environment 100 can be implemented using one or more servers 125, as well as computers other than servers, including a server pool. Indeed, server 125 and client 135 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 125 and client 135 may be adapted to execute any operating system, including Linux, UNIX, Windows, Mac OS, or any other suitable operating system. According to one embodiment, server 125 may also include or be communicably coupled with a mail server.

In the present implementation, and as shown in FIG. 1, the server 125 includes a processor 118, an interface 117, a memory 120, and one or more hosted applications 122. The interface 117 is used by the server 125 for communicating with other systems in a client-server or other distributed environment (including within environment 100) connected to the network 112 (e.g., clients 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 125 may also include a user interface, such as a graphical user interface (GUI) 160a. The GUI 160a comprises a graphical user interface operable to, for example, allow the user of the server 125 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to select from a list of suggested entries for input into a data field displayed in GUI 160a. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CLI) that processes information in the platform and efficiently presents the results to the user visually.

Generally, example server 125 may be communicably coupled with a network 112 that facilitates wireless or wireline communications between the components of the environment 100 (i.e., between the server 125 and clients 135), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 125. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure, and the elements hosted by the server 125, such as the work item module 104, may be implemented locally at a client 135 or locally at server 125.

Clients 135a-b may have access to resources such as server 125 within network 112. In certain implementations, the servers within the network 112, including server 125 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135a-b can use cloud-based services to quickly receive software upgrades, applications, and other resources that would otherwise require a lengthy period of time before the resources can be delivered to the clients 135a-b. Additionally, other devices may also have access to cloud-based services, such as on-demand services provided by servers accessible through network 112.

As described in the present disclosure, on-demand services can include multiple types of services such as products, actionable analytics, enterprise portals, managed web content, composite applications, or capabilities for creating, integrating, using and presenting business applications. For example, a cloud-based implementation can allow client 135 to transparently upgrade from an older user interface platform to newer releases of the platform without loss of functionality.

As illustrated in FIG. 1, server 125 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 125 and, specifically, the one or more plurality of hosted applications 122. Specifically, the server's processor 118 executes the functionality required to receive and respond to requests from the clients 135a-b and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 125.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135a-b and their associated client applications 144 or from other servers or components through a network 112. In certain cases, only one hosted application 122 may be located at a particular server 125. In others, a plurality of related and/or unrelated hosted applications 122 may be stored at a single server 125, or located across a plurality of other servers 125, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135a-b or client applications 144 via the network 112 (e.g., through the Internet). Further, while illustrated as internal to server 125, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 125, as well as remotely at client 135.

As illustrated, processor 118 can also execute a planning module 104 that provides services for applications such as hosted application 122, client application 144, or clients 135 within network 112. In some implementations, the planning module 104 can be executed by a different processor or server external to server 125, such as by a server communicably coupled to server 125 through network 112. For example, the planning module 104 may be provided as an on-demand service through a cloud computing network, as a web service accessible via network 112, or as a service provided on a dedicated server. The planning module 104 can provide interfaces, modules, services, or metadata definitions that enable hosted application 122 or client application 144 to analyze business and transactional data for efficient business planning. In some implementations, a calculation engine 106 is used to maintain a persistency for each version of a business plan.

The planning module 104 may provide services for planning applications using design time and runtime tools for analyzing and visualizing business data. A planning application can provide tools for generating a plan for any aspect associated with a particular business. Examples of planning applications can include demand planning, expense planning, or profitability planning applications. In some instances, financial planning applications provide tools to create plan data for all components of a financial statement, such as for income statements, balance sheets, and cash flow statements. Under customer relationship management, a sales target setting application can provide the necessary tools for management of sales to define sales targets for a business organization's employees. The sales target setting application can enable sales managers and their teams to plan sales targets at different levels, monitor sales continuously throughout the sales cycle, and adjust sales plans accordingly. The continuous planning provided by planning applications ensures that sales targets are attainable and can be regularly re-aligned when necessary. Further, for supply chain management, demand planning applications enable users to maintain and calculate forecasts for materials or forecast groups. Forecasts can be important for improving the reliability of a supply plan, and increased transparency and accuracy for the forecasts help the planning for future demand. The demand planning applications capture and aggregate business data to provide a comprehensive view of all relevant figures and the information needed for forecasting. Although the component within the planning module 104 is illustrated as a separate module in FIG. 1, the different components may be implemented as separate modules external to work item module 104 or as combined modules in any arrangement.

In general, the server 125 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 125 and its one or more hosted applications 122.

Memory 120 may also store data objects such as planning business objects 124 associated with one or more users. Each planning application with a different set of requirements can create its own business object. In other words, a planning business object is of a defined type with a specific implementation for a planning application. In some implementations, there is one planning business object type per planning application. Accordingly, each new business object can define a new planning application. Memory 120 can also store transactional and analytical data associated with a business plan. In some instances, memory 120 can function as an in-memory database to store the transactional and analytical data. The in-memory database implementation allows efficient storage of both transactional and analytical data in a system's main memory to allow seamless access to and propagation of transactional data in real-time.

A plan can be defined as an instance of a planning business object. A business plan can consist of different layers of granularity depending on the particular planning application associated with the plan. For example, for a business organization's customer relationship management sales planning, a plan covers all planning activities in this area without further differentiation. In the context of supply chain management demand planning, the plan can be defined by the responsibility of one planner. In expense planning for financials, the plan can be embedded in the structure of cost centers, and can be associated with one cost center or a summary of all cost center planning within a fiscal year.

Business planning is realized using application specific planning business objects. The planning business objects encapsulates all functionality for a user to run a specific planning process and store relevant data. The planning business objects can reuse a common business object runtime that allows for mass data handling utilizing an in-memory database for buffering, planning function execution, and primary persistence. The user can perform business planning based on the planning business objects in a user interface that is closely related to user interfaces already designed for reporting but with enhanced functionality. For example, a reporting user interface can be used with enhancements for data entry and planning functionality. In some implementations, a spreadsheet application can be used as the planning user interface.

The illustrated environment of FIG. 1 also includes one or more clients 135. Each client 135 may be any computing device operable to connect to or communicate with at least the server 125 and/or via the network 112 using a wireline or wireless connection. Further, as illustrated in FIG. 1, client 135a includes a processor 146, an interface 142, a graphical user interface (GUI) 160b, a client application 144, and a memory 150. In general, client 135a comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes client 135a, alternative implementations of environment 100 may include multiple clients communicably coupled to the server 125, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. The term "client" may also refer to any computer, application, or device, such as a mobile device, that is communicably coupled to one or more servers through a network 112. Moreover, while each client 135 is described in terms of being used by a single user, this disclosure contemplates that many users may use one computer, or that one user may use multiple computers.

The GUI 160b associated with client 135a comprises a graphical user interface operable to, for example, allow the user of client 135a to interface with at least a portion of the platform for any suitable purpose, such as creating, preparing, requesting, or analyzing data, as well as viewing and accessing source documents associated with business transactions. Generally, the GUI 160b provides the particular user with an efficient and user-friendly presentation of business data provided by or communicated within the system. The GUI 160b may comprise a plurality of customizable frames or views having interactive fields, pull-down lists, and buttons operated by the user. In particular, GUI 160b may display a visual representation of work items 154 to a user and present a visual indicator of the relative importance of the work items 154 based on a particular business context of the user. More generally, GUI 160b may also provide general interactive elements that allow a user to access and utilize various services and functions of application 144. The GUI 160b is often configurable, supports a combination of tables and graphs (bar, line, pie, status dials, etc.), and is able to build real-time portals, where tabs are delineated by key characteristics (e.g. site or micro-site). Therefore, the GUI 160b contemplates any suitable graphical user interface, such as a combination of a generic web browser, intelligent engine, and command line interface (CLI) that processes information in the platform and efficiently presents the results to the user visually.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 125 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of client 135 through the display, namely, the GUI 160b.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 125 that can be accessed by client computer 135, in some implementations, server 125 executes a local application that features an application UI accessible to a user directly utilizing GUI 160*a*. Further, although FIG. 1 depicts a server 125 external to network 112, server 125 may be included within the network 112 as part of an on-demand context solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2A:
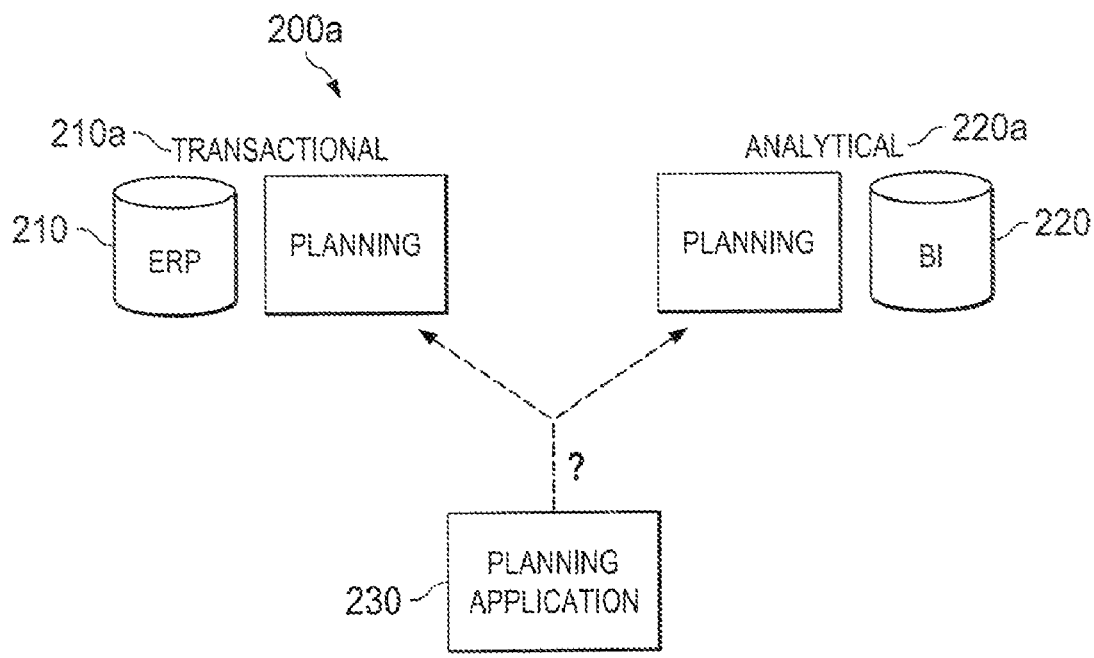
FIGS. 2A-B depict high-level diagrams of example planning infrastructures using an appropriate system, such as the system described in FIG. 1.
Figure 2B:
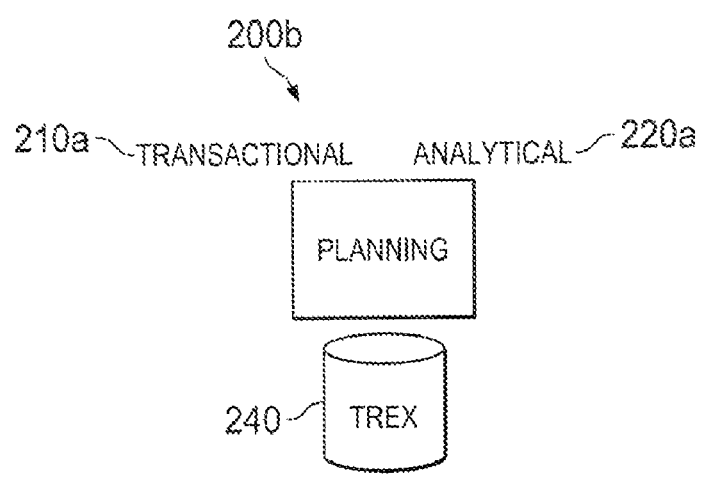

FIGS. 2A-2B are high-level diagrams of example planning infrastructures 200*a* and 200*b*. In a typical implementation, as depicted in FIG. 2A, a planning application 230 may need to access separate databases 210 and 220 to obtain transactional data 210 and analytical data 210 for generating a business plan. For example, a user of a planning application may access analytical data while performing a planning task. The transactional data associated with the business plan may be stored in a separate database, however, and accordingly, real-time changes to the transactional data may not be readily visible or accessible to the user. As seen in FIG. 2B, transactional data 210*a* and analytical data 220*a* can be associated with an in-memory repository 240 managed by a calculation engine. The calculation engine includes services provided to planning applications for intelligent searching, classification, and aggregation of large collections of documents as well as searching and aggregating business objects. In some implementations, the calculation engine is a search and classification engine that can be integrated into enterprise solutions, such as to enhance the performance of online analytical processing.

Various features of the search and classification engine can include text search, including exact search, boolean search, wildcard search, linguistic search (grammatical variants are normalized for the index search) and fuzzy search (input strings that differ by a few letters from an index term are normalized for the index search). Other features can include text mining and classification using a vector space model, classification of groups of documents using query based classification, example based classification, or keyword management, and a structured data search not only for document metadata but also for mass business data and data in business objects. Further, the search and classification services can be used as a primary persistency for certain business plan versions. Typically, the transaction and analytical data 210*a* and 220*a* are split across different components of a system as shown in FIG. 2A, and deployment of a planning application would have limited information access due to the different systems. The in-memory repository 240, however, allows access to transactional and analytical data 210*a* and 220*a* from a single repository.

Figure 3:
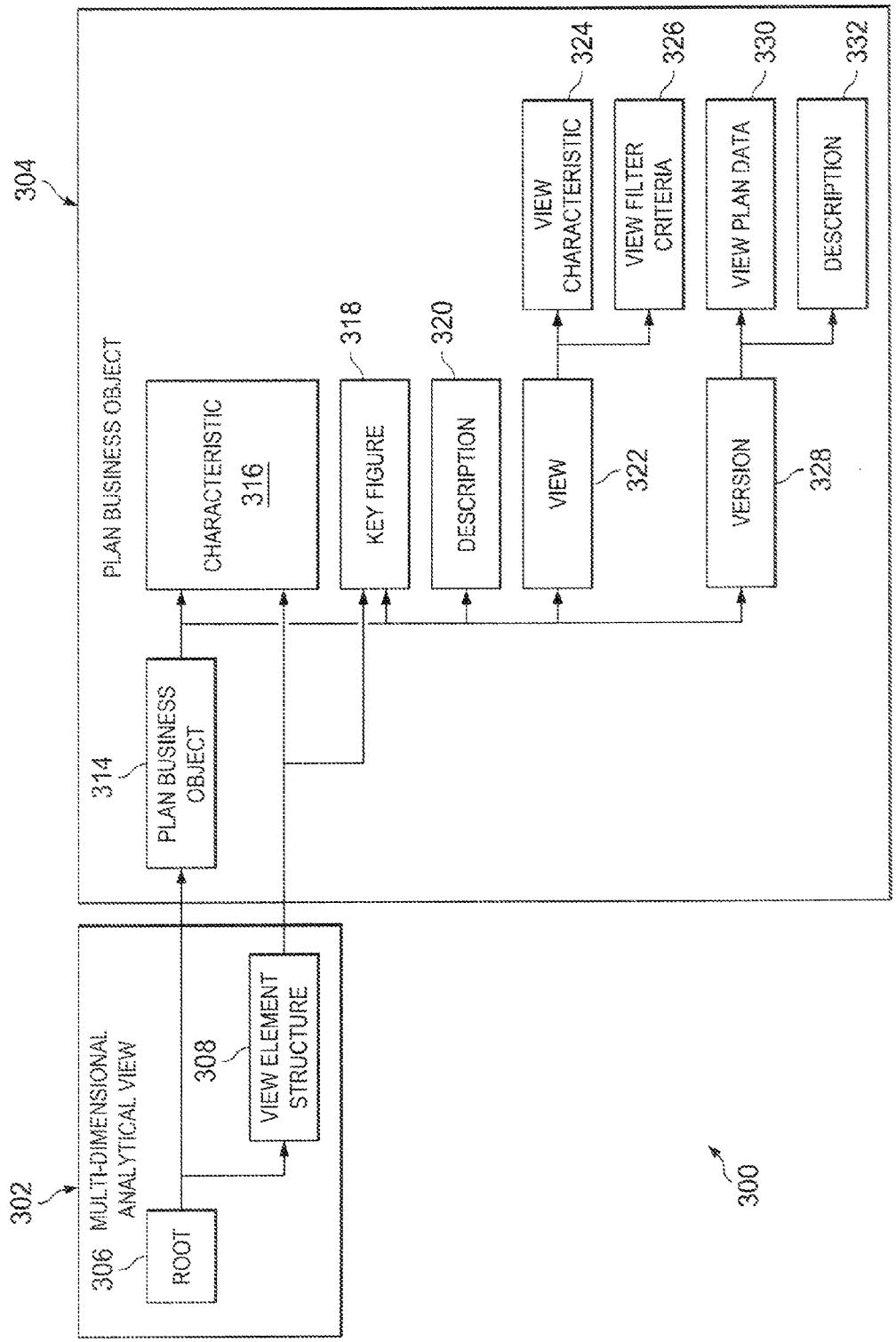
FIG. 3 illustrates an example model of a planning business object maintained using an appropriate system, such as the system described in FIG. 1.

Planning applications can be modeled as semantic business objects that follow a common pattern. At least one benefit of this implementation is that plan instances become tangible entities with lifecycles and statuses. Accordingly, complex configuration data or patterns that were previously accessible only to a system administrator, for example, can be accessible to different users of a planning application in the form of a business object. Further, the planning business object can be used or manipulated as a typical business object, such as included in different user interfaces or accessed by different applications. FIG. 3 illustrates an example model 300 of a planning business object 304. The example model 300 represents a common modeling approach, but each particular planning business object can be structured according to the specific requirements of the particular planning application associated with the planning business object.

In certain implementations, the planning business object can contain three types of nodes. A first type of node includes metadata nodes that provide a field catalog for the plan instance in terms of characteristics and key figures. Further, the planning business object 300 can include a set of transient nodes that defines filtered and aggregated views on the plan data. A view node instance provides a handle for a combination of aggregation level and filter criteria, and represents a SQL statement with 'group by' and 'where' clauses. Finally, the planning business objects include application data nodes that contain the plan header data, versions of the plan, and the plan data.

A Multi-Dimensional Analytical View 302 (MDAV) can be used to present a Root node 306 and View Element Structure component 308. An MDAV can be an object containing key figures and characteristics for a multidimensional view of business data for reporting. In some implementations, the MDAV is an analytics metadata object describing a data source and the structure of its data in terms of an n-dimensional OLAP (online analytical processing) cube. Its root node carries general data that, for example, classify the MDAV as a basic, union, virtual or plan MDAV. The MDAV view elements describe the data cube's characteristics (dimensions) and key figures. Typically, a planning application would model one plan BO and one corresponding MDAV, which can be seen as an enrichment of the BO model with analytical metadata, like the classification of BO fields as characteristic or key figure. The planning business object 314 in FIG. 3 can contain identification of a plan or an application specific semantic key. The planning business object 314 bundles a set of plan data based on the scope of a plan instance. Accordingly, the appropriate semantic key depends on the planning application. For some planning applications, such as demand planning, for example, the scope of the plan is defined by its content, and it is up to the user who creates the plan instance to define this scope by choosing the data to be planned. For these applications, a plan identification label is the suitable human readable identifier of a plan. But for other applications, the scope of a plan instance may need to be predefined using a different semantic key. For example, a balance sheet plan could be identified by a combination of a company, a set of books and an appropriate fiscal year.

Various factors can be considered when defining the semantic key given the scope of a planning business object instance. For example, a plan should bundle data that is planned using the same structure. A plan should bundle a set of plan data that is typically processed together within a certain step of the planning process, because the plan instance defines the granularity on which versions of plan data can be kept. These versions can carry a status reflecting the semantic and current processing status of the corresponding planning step (e.g., 'Approved' or 'Default' for reporting). Further, the semantic key can be defined based on how plan data is selected for reporting. A reporting user may not know details of the planning process and will be unable or unwilling to select plan data via plan and version IDs. The reporting user instead may be able to select data via other selection criteria such as a company and fiscal year. In this instance, the plan business object key should contain these fields in order to ensure that the corresponding plan data can be found. Still further, the key should contain a validity period or time component to allow for splitting of the plan instance over time or to change the structure of the plan if the business changes.

The Description node 320 contains language dependent description for each plan. Planning business objects contain metadata as well as application data. Therefore they can expose their planning and storage structure as well as additional metadata in the Characteristic 316 and Key F*igure* 318 nodes that provide a type of field catalogue. The field catalogue lists all characteristics and key figures of the maximum planning structure and describes whether they are used in the planning structure. For fields that are also part of the maximum storage structure this setting also determines whether they are used in the storage structure.

The Key Figure node 318 can be a metadata node that lists all key figures available for the plan. The Characteristic node 316 is a metadata node that lists all characteristics that are available for plan data maintenance and provides metadata for the characteristics, describing the used planning and the used storage structure. The instances of this node are created automatically during the creation of a plan business object instance, the key user may then change the default settings if the planning application permits.

The View node 322 is a transient metadata node and provides handles for combinations of aggregation level and filter criteria. Mass data and the aggregation and disaggregation of plan data can be maintained in the calculation engine 106. Accordingly, the business object interface may need to grant access to aggregated and filtered views on the data. Each instance of the View node 322 identifies a specific aggregation level plus a set of filter criteria, so the View node 322 represents a handle for an SQL statement with 'group by' and 'where' clauses. When a service consumer (e.g., OLAP) wants to read or write aggregated data, the user may be required to create an instance of the View node 322.

For example, a sales target plan can have three characteristics: employee, product, and month. A user may want to maintain sales targets for the first quarter and enters the selection month=1-3 into the plan maintenance user interface. Unless the user expands further dimensions, the user interface needs to display subtotals for the first key column 'employee,' considering only plan values for month 1-3. When the virtual information provider for plan data receives this request, it creates an instance of the View node 322, one View Characteristic child node 324 with value 'Employee,' and a View Filter Criteria child node 226 with values of characteristic name='Month,' lower boundary='1' and upper boundary='3.' The unique ID of this view node can then be used to retrieve the aggregated data via the View Plan Data node 330.

The View Characteristic node 324 is a metadata node that defines the aggregation level of the View instance. When a View instance is used to retrieve View Plan Data 330, only the characteristics listed in the View Characteristic node 324 are filled; other characteristics are set to initial and all key figures are aggregated with regard to those characteristics. The View Filter Criteria node 326 is a set of metadata nodes that contain the filter criteria represented by the View instance.

The Version node 328 provides a version identification of plan data values. In some implementations, only the planned values in a plan instance are versioned and not the plan metadata. Each version can be identified by an ID modeled as a key of the Version node 328, or by any other type of semantic key, and it may be associated with a status (e.g. consistency, block or release status). The status variables and values can be aligned among planning applications where feasible. In some implementations, the user can be asked to enter a language dependent description of the version of a plan in the Description node 332.

The plan values are exposed by a transient View Plan Data node 330 with the maximum planning structure. The View Plan Data node 330 can be used to retrieve, maintain, and modify filtered and aggregated views on the plan data. If a service consumer creates a View node 322 instance without filter criteria and without aggregation, the corresponding View Plan Data node 330 instances represent the individual entries in the storage layer. The View Plan Data node 330 serves as an application programming interface (API) for retrieval and maintenance of plan data. It provides both plan and reference data according to the filter and aggregation level defined in the view unique ID. It can contain characteristics and key figures that need to be available for planning in the planning application represented by the specific business object.

Figure 4:
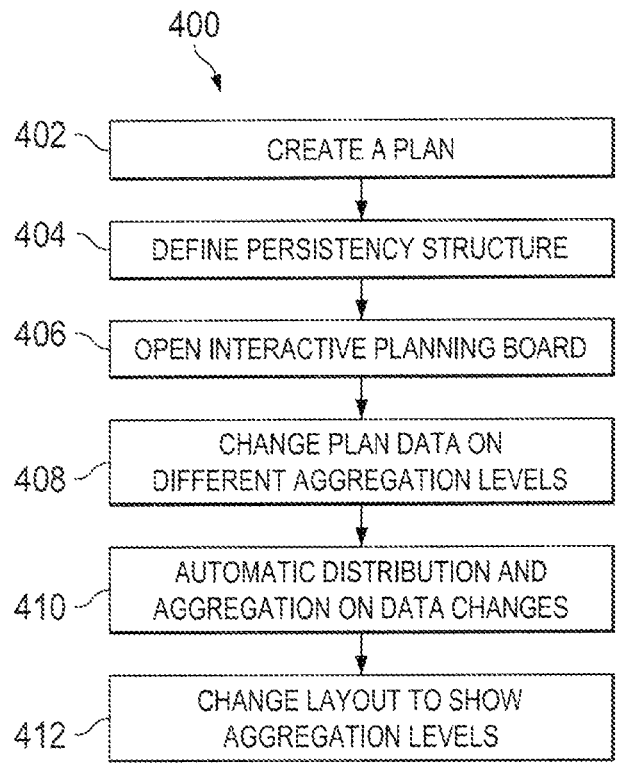
FIG. 4 depicts an example process for presenting a business plan using an appropriate system, such as the system described in FIG. 1.

FIG. 4 illustrates an example process 400 for presenting a business plan. A planning application creates a Multi-Dimensional Analytical View instance for each planning business object at 402. The persistency structure is defined at 404. In some implementations, a calculation engine 106 is used to maintain a primary persistency for each version of a business plan.

An interactive planning board is opened at 406. The interactive planning board can be implemented using an appropriate user interface for providing planning functions to a user (e.g., buttons, drop down boxes, etc.). In some implementations, the interactive planning board is provided using a spreadsheet application, which can provide appropriate functionality for maintaining metadata for a business object, creating a plan, maintaining the plan structure, maintaining constraints, and maintaining available planning layer views. A spreadsheet application can also provide functionality to assist in reporting such as clipboard, auto-fill functions, macros, or free cell selection, allowing full flexibility of reporting user interfaces available for planning.

One characteristic of using a spreadsheet application to implement a planning user interface is to provide a "backend controlled" area. Within the backend area, all values are delivered by the backend system, and all calculations, such as planning functions, trigger a backend roundtrip. Thus, the backend system guarantees the accuracy of the values and uses the same algorithms as for any other consumer.

After the interactive planning board is opened, plan data is changed on different aggregation levels at 408. A business plan can include multiple aggregation levels. For example, a particular business plan can include aggregation levels such as region, products, or customers. The plan data can be presented or logically grouped using different levels of granularity at the different aggregation levels. In some instances, different users can perform tasks associated with the business plan at more than one aggregation level of the business plan. In the present example, a user can modify data related to a region of a particular business plan while a different user manages data at the customer level, for example. Plan data associated with the business plan can be changed by either a user or automatically within the system. The data changes are aggregated and automatically distributed to various aggregation layers at 410. Without the planning module 104 of the present disclosure, changes to planning data at one aggregation level may not be reflected in other aggregation levels of the plan. The planning module 104, however, can automatically distribute plan data to storage layer granularity, and the changes to planning data can then be available to all aggregation levels. Accordingly, plan data can be entered and changed on any aggregation level, and the changes are automatically distributed to other aggregation levels.

Finally, the layout presented to the user is changed to show aggregation levels at 412. Different user interface views can be presented to the user as different report faces, depending on the context of the user. A report face can be a compilation of data for evaluation where online analysis and drill-down is supported in every possible direction and on a very detailed level. The report faces can be analytical metadata objects that define certain report settings, including which parameters are offered for data selection on the variable screen and how they are mapped to MDAV characteristics, global restrictions that cannot be changed by the user, and available key figures. For example, MDAV key figures may not only be used directly, but also as a basis for the calculation of new key figures or for restricted key figures. An example for restricted key figures would be key figures with quarterly values that are derived from monthly values in the MDAV.

Each of the different aggregation levels can be represented in the user interface with different views. The user can be given the option to select a particular view for a particular aggregation level. Further, key values and figures can be automatically updated to show the changes to plan data from different aggregation levels. In some instances, the plan data can be automatically distributed to various levels of the planning business object, including the storage layer, which ensures data consistency across all levels in the planning business object hierarchy. Further, the distribution function for each planning instance can be automatically executed by the planning module 104 or manually selected by a user.

Figure 5:
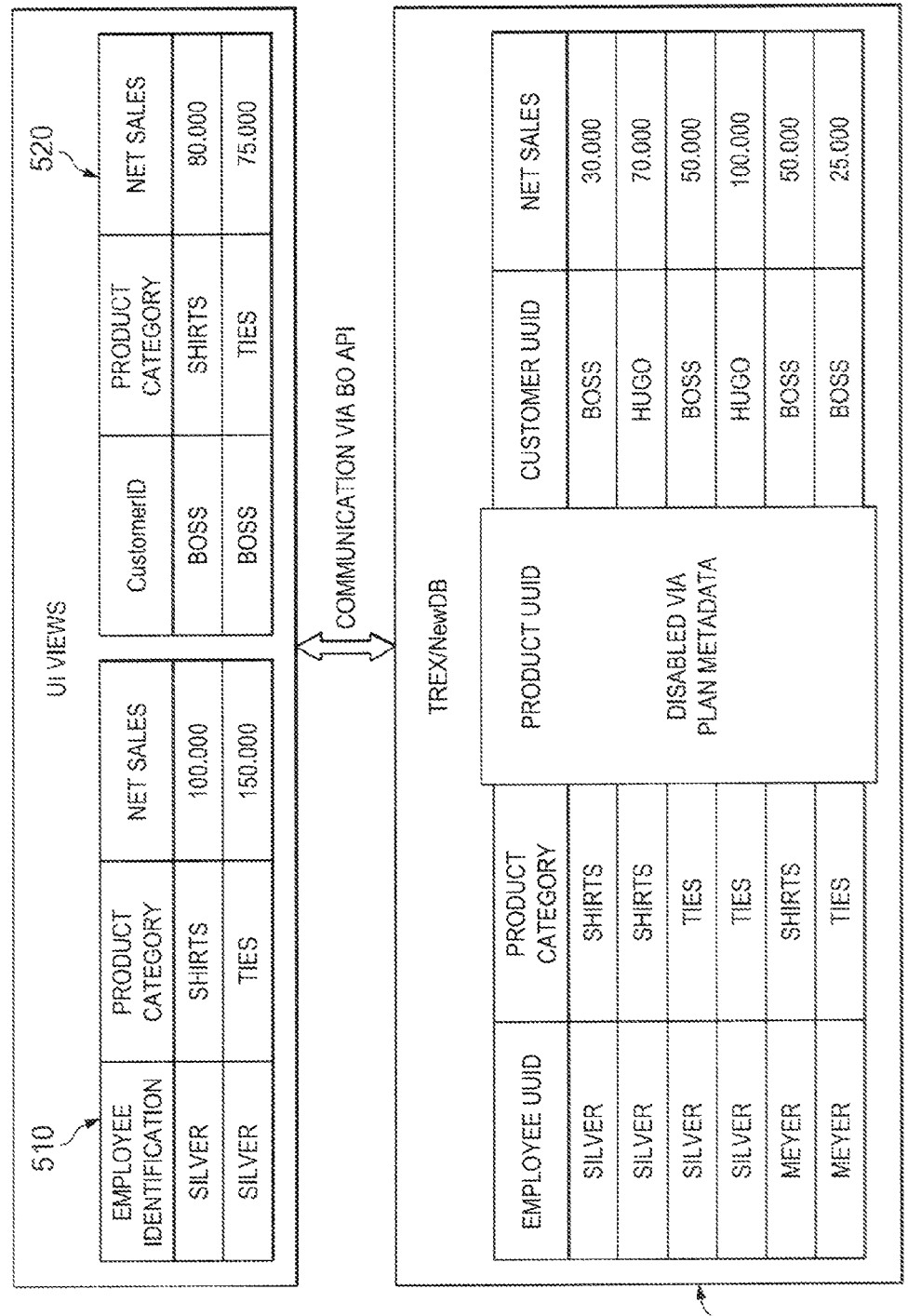
FIG. 5 illustrates example plan data views and storage layer representation using an appropriate system, such as the system described in FIG. 1.

FIG. 5 depicts example user interface views and representations 500 of plan data at different levels of granularity. The user interface views can include different views for different aggregation levels of a business plan. In the illustrated example, a business plan can be used to monitor employee sales of clothing items. A user may view data associated with the plan at different levels of granularity. For example, a user can view information regarding sales of clothing items based on a specific user as depicted in view 510. In view 510, a user can view information regarding the net sales achieved by a particular employee for specific product categories, such as shirts and ties. In some instances, at this aggregation level, the user may not be able to view other details related to sales of clothing items such as the breakdown of the employee's sales by customer. Other views, however, may present different aggregation levels and allow a user to view other details regarding net sales of clothing items. View 520 represents a view of sales data based on a particular customer and the product categories purchased by the customer. The data presented to the user in views 510 and 520 represent data grouped into different aggregation levels.

In some implementations, the data can also be disaggregated, or broken down, into a more detailed level of granularity. In the illustrated example, data can be disaggregated at the storage layer, as represented by the database view 530. The database view 530 represents data at the lowest level of granularity in which a user can view data at a detailed level. In view 530, the user can view details regarding the net sales of multiple users broken down by both product category and customer. Different users may, in some instances, access different views concurrently. A first user may be responsible for inputting or modifying data for specific users and would need access to view 510, for example, while a second user may need to access data for a specific customer and would need access to view 520. Using automatic distribution of plan data to storage layer granularity, such as described above in connection with FIG. 4, changes by the users to data represented in either view 510 or 520 can be automatically propagated in real time to the lowest level of granularity and other views of the data. In some implementations, the communication of plan data to the storage layer can be accomplished using a business object application programming interface (API).

At design time, each planning application creates a plan MDAV instance for each planning business object. The MDAV defines the available field catalog in terms of characteristics and key figures. The planning application then creates an analytical metadata object (MKFC), similar to the "report faces" described above, that defines particular report settings in association with this MDAV to model compulsory business logic. For example, in Financials, the MKFC would be used to derive the value for parameter 'Fiscal Year Variant' from parameters 'Company' and 'Set of Books.' Based on this MKFC, the planning application defines one or more report faces. For example, for expense planning the application can define two report faces, one for key users and one for cost center managers. The report faces for managers would contain restricted key figures to ensure that every manager can only maintain plan data for his cost center. Key users can be allowed to create and deploy additional report faces for planning, just like for any other MKFC. Finally, the planning application can create at least one layout and one variant as default. These metadata objects can use the maximum set of characteristics offered by the planning business object. The default variant should mark those parameters that are needed to uniquely identify a plan instance as mandatory parameters.

Figure 6A:
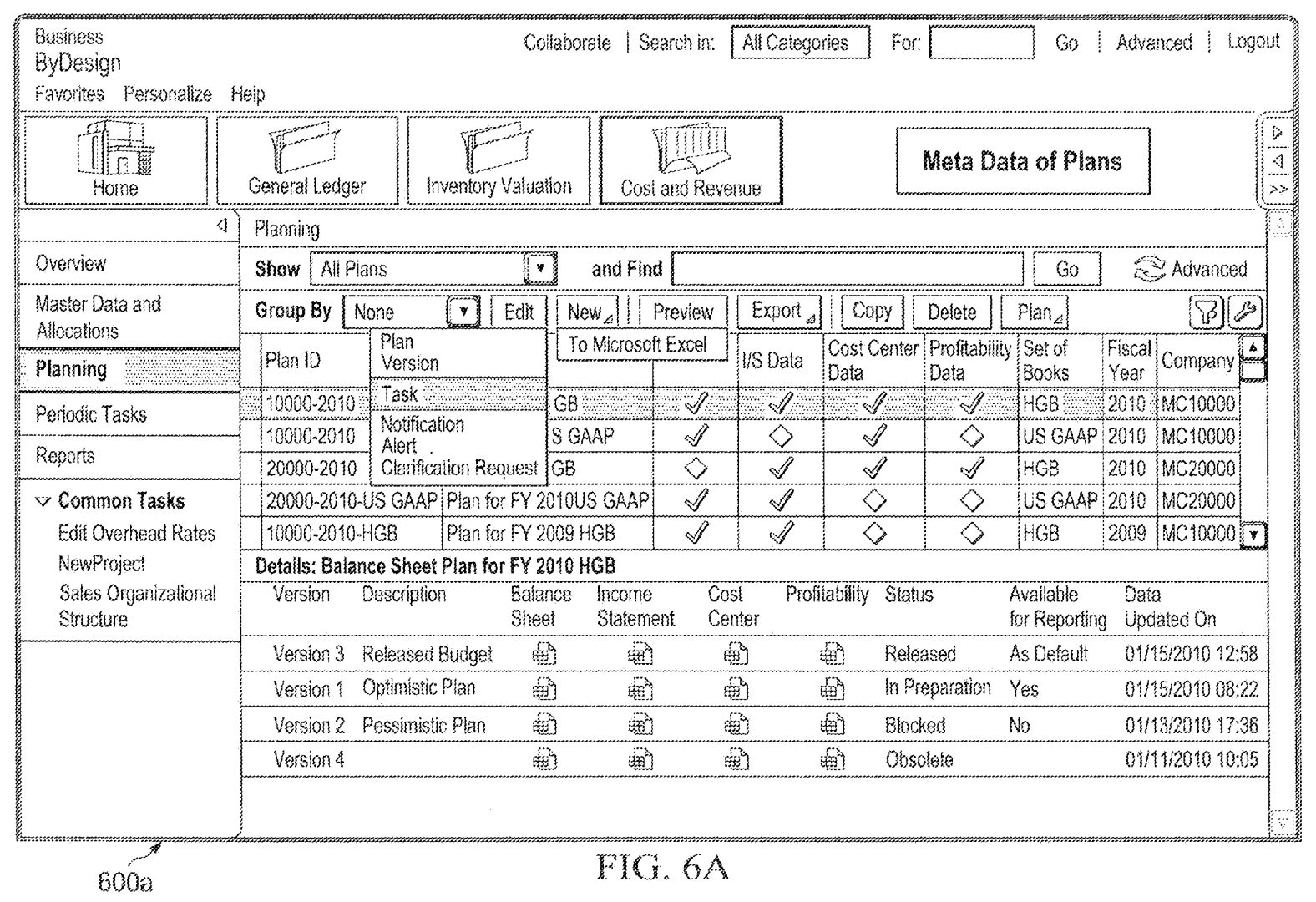

FIG. 6A illustrates an example screenshot 600a of a user interface for viewing data associated with a business plan. As seen in FIG. 6A, a user interface frontend can be used to present planning reports and options to a user. In some implementations, different aggregation levels of a particular planning business object can be presented to a user. Further, changes to plan data in one aggregation level can automatically be distributed to other aggregation levels and presented in the user interface in real-time. Still further, certain data fields can be suppressed for a particular aggregation level or view based on a user's particular context.

Figure 6B:
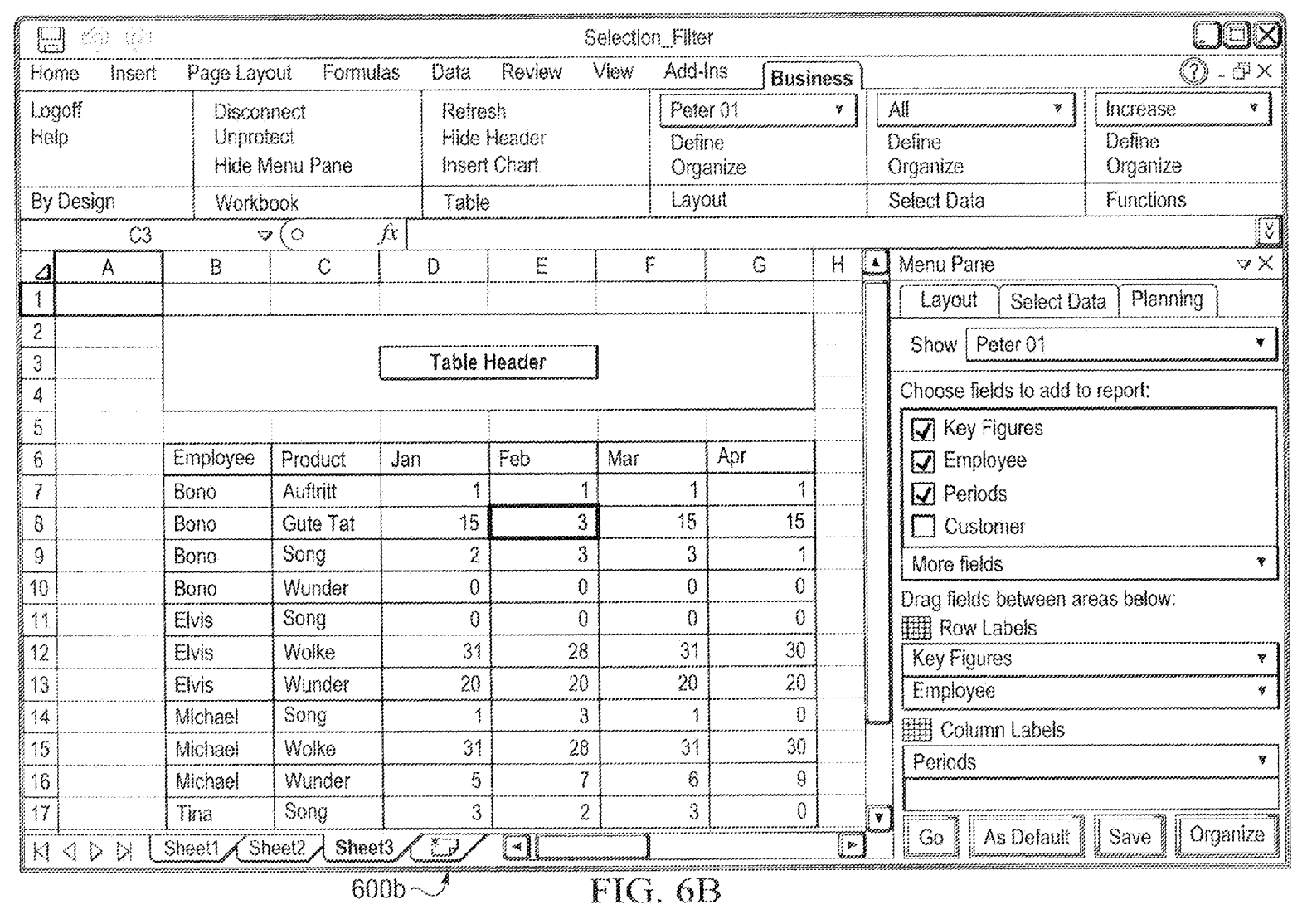

FIG. 6B illustrates an example screenshot 600b of a user interface for changing a layout and modifying a cell associated with a business plan. As depicted in FIG. 6B, a user has flexibility to add or remove certain fields. In some implementations, a planning application includes a predefined set of parameters and fields to include in a report. The user can also select particular fields from the predefined set of fields to include in the report. In certain implementations, the user can also add new fields that are not included in the predefined set of fields to the layout. Accordingly, a user or application developer can add arbitrary master data attributes or key figures to a particular layout. In some implementations, a key user can also choose the characteristics that are applicable to a particular plan instance using an interface such as the one depicted in FIG. 6B.

Figure 7:
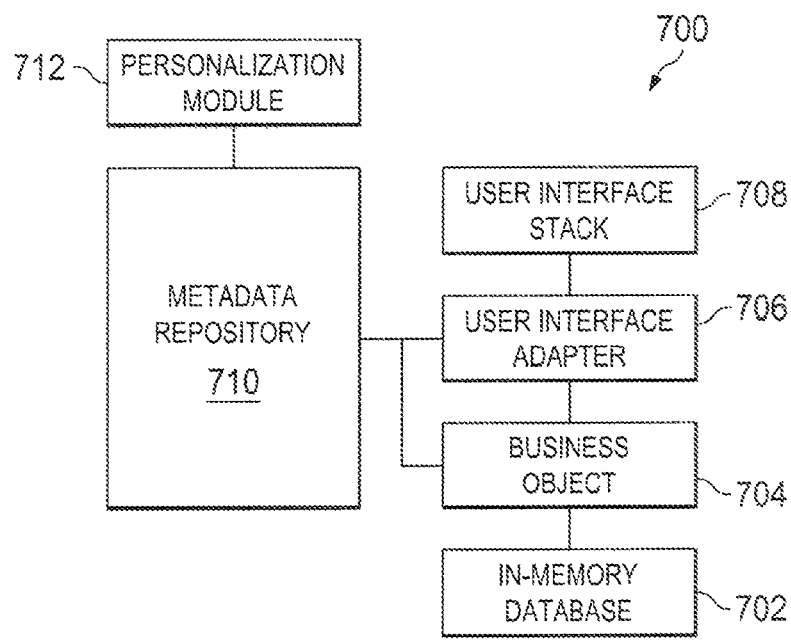
FIG. 7 illustrates an example architecture overview of a business planning infrastructure.

FIG. 7 depicts an example architecture overview of a business planning infrastructure 700. A database such as in-memory database 702 can include a calculation engine 106 used to perform calculations on plan data such as aggregation, disaggregation, evaluation, revaluation, and other actions associated with plan data. The persistency and session buffers can be maintained in the in-memory database 702. The business object 704 can be used to model business planning applications and plan instances. In some implementations an application programming interface (API) can be coupled to the business object 704 to allow access to the planning business object 704 by a user, agent, user interface, or other business objects.

A user interface adapter 706 is also depicted in FIG. 7. The user interface adapter 706 can be used as an interface between the planning business object 704 and user interface elements such as the elements included in the user interface stack 708. The user interface stack 708 can include applications or processes for generating a user interface for presenting elements of and data associated with the business object 704. For example, the user interface stack 708 can generate a reporting interface and layout for particular data items in a plan and aggregation levels of the plan. The user interface stack 708 can automatically determine the rows, columns, or fields in the user interface to be used for displaying plan data.

In some implementations, the business object 704 and user interface adapter 706 are coupled to a metadata repository 710. The metadata in the metadata repository 710 can define parameters of the planning model represented in the business object 704 and the layout for the business object 704. Data structures contained in the metadata repository 710 can also define key figures, functions, reporting interfaces, layouts, and other elements for presenting the business object 704 to a user. In some instances, a personalization module 712 can also include metadata for user personalization of selection parameters and layouts.

In certain implementations, extensibility features can be provided for planning business objects. For example, a planning business object can include predefined fields or functions, but a user may later need to add fields to the planning business object or extend the predefined fields. Accordingly, certain predefined fields or functions in the planning business object can be extended by a user. In other words, extensibility can be included for a planning object, and the extension of certain fields within the planning business object can be propagated throughout the planning business object. Examples of extensibility features can include extension of analytics by characteristics and key figures.

Figure 8:
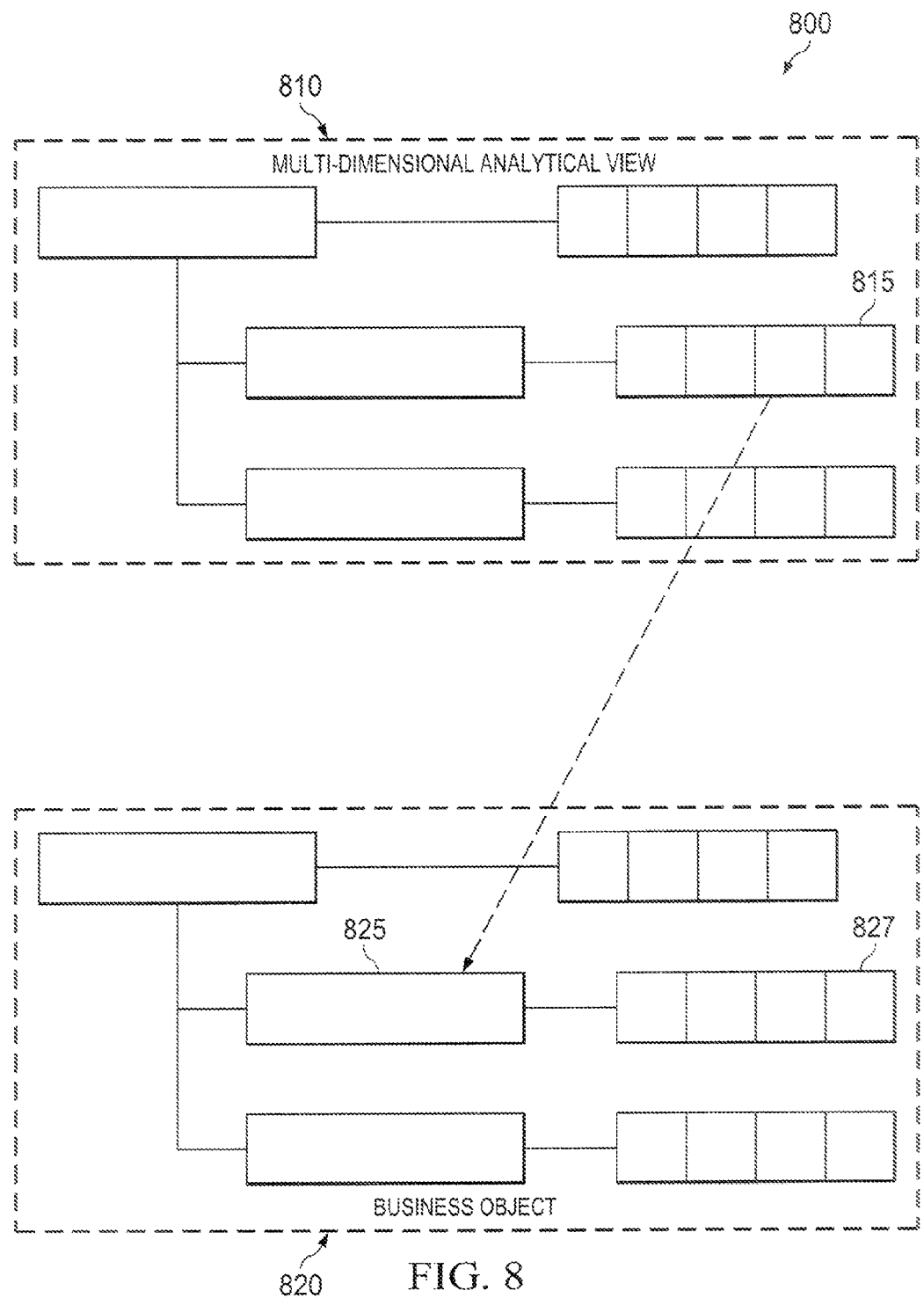
FIG. 8 illustrates an example relationship between a Multi-Dimensional Analytical View and a business object for implementing extensibility features.

The extension features can be facilitated by associating analytical reports with an MDAV of the business object. FIG. 8 illustrates the structure 800 of and relationship between an MDAV and a business object for implementing extensibility features. As illustrated in FIG. 8, an MDAV 810 includes a reference field 815 which is associated with a node 825 of a planning business object 820. More particularly, the properties of reference field 815 indicate a path to node 825 of business object 820. According to some implementations, reference field 815 of MDAV 810 is a "release-stable" anchor to node 825. For example, a provider of MDAV 810 might promise to not change reference field 815 in future software updates. Clients and/or partners might then confidently use reference field 815 and its association with node 825 to design extensions, analytical reports, or other entities consuming MDAV 810.

Business object 820 also includes reference field 827 according to some embodiments. Reference field 827 may also comprise a "release-stable" anchor which allows the creation of extension fields based thereon. In some embodiments, a report (e.g., analytical report) may be extended based on an extension to a node of a business object underlying the report. The process of adding an extension field to a node of a business object can include, for example, determining a MDAV object model including a reference field referring to the node of the business object, determining at least one report associated with the determined MDAV object model, receiving a selection of the at least one report, extending the MDAV object model associated with the report based on the extension field, and extending the selected report based on the extension field.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for analyzing business data for planning applications, comprising:
generating, by operation of at least one computer, a business object containing parameters and plan data of a business plan, wherein the plan data is represented by a hierarchical plurality of aggregation levels and logically grouped at different levels of granularity at each aggregation level;
identifying a change to a particular item in the plan data, the change associated with a particular aggregation level; and
distributing the change to the particular item to a lowest level of granularity of the plan data of at least one aggregation level above and of at least one aggregation level below the particular aggregation level.

2. The method of claim 1, wherein the lowest level of granularity of the plan data is a storage layer of the business plan.

3. The method of claim 1, wherein the change is identified by accessing transactional data associated with the particular item.

4. The method of claim 3, wherein the transactional data is accessed from an in-memory database.

5. The method of claim 4, wherein the in-memory database contains transactional data and analytical data.

6. The method of claim 1, wherein the change is identified by receiving a user input indicating modification of the particular item.

7. The method of claim 1, wherein each aggregation level is associated with a particular view of data in the aggregation level.

8. The method of claim 7, wherein each view associated with the particular item is updated in response to the change.

9. The method of claim 7, wherein a view associated with the storage layer of the business plan comprises a view of the plan data at the lowest level of granularity of the plan data.

10. A computer program product encoded on a non-transitory, tangible storage medium, the product comprising computer readable instructions for causing one or more processors to perform operations comprising:
generating a business object containing parameters and plan data of a business plan, wherein the plan data is represented by a hierarchical plurality of aggregation levels and logically grouped at different levels of granularity at each aggregation level;

identifying a change to a particular item in the plan data, the change associated with a particular aggregation level; and distributing the change to the particular item to a lowest level of granularity of the plan data of at least one aggregation level above and of at least one aggregation level below the particular aggregation level.

11. The computer program product of claim 10, wherein the lowest level of granularity of the plan data is a storage layer of the business plan.

12. The computer program product of claim 10, wherein the change is identified by accessing transactional data associated with the particular item.

13. The computer program product of claim 12, wherein the transactional data is accessed from an in-memory database.

14. The computer program product of claim 13, wherein the in-memory database contains transactional data and analytical data.

15. A system, comprising:
  memory operable to store at least one business object containing parameters and plan data of a business plan, wherein the plan data is represented by a hierarchical plurality of aggregation levels and logically grouped at different levels of granularity at each aggregation level; and
  one or more processors operable to:
    identify a change to a particular item in the plan data, the change associated with a particular aggregation level; and
    distribute the change to the particular item to a lowest level of granularity of the plan data of at least one aggregation level above and of at least one aggregation level below the particular aggregation level.

16. The system of claim 15, wherein the change is identified by receiving a user input indicating modification of the particular item.

17. The system of claim 15, wherein each aggregation level is associated with a particular view of data in the aggregation level.

18. The system of claim 17, wherein each view associated with the particular item is updated in response to the change.

* * * * *